United States Patent Office 2,825,522
Patented Mar. 4, 1958

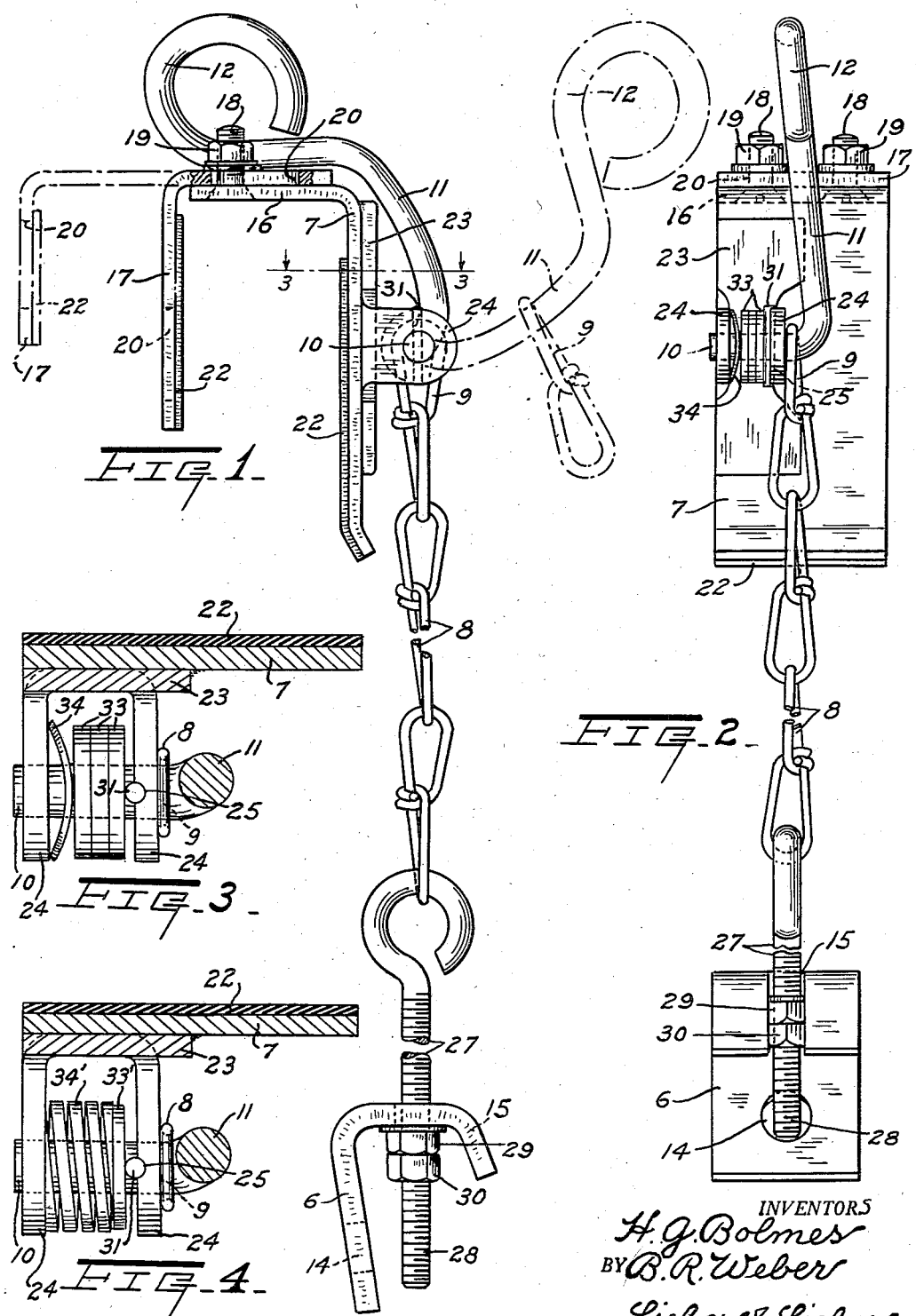

2,825,522

BOAT-TRAILER TIE-DOWN MECHANISM

Henry G. Bolmes, West Allis, and Bernard R. Weber, Wauwatosa, Wis., assignors to The Fulton Company, West Allis, Wis., a corporation of Wisconsin Application January 23, 1956, Serial No. 560,780

5 Claims. (Cl. 248—361)

The present invention relates generally to improvements in devices for insuring safe transportation of diverse articles from place to place with the aid of vehicles, and relates more specifically to improvements in the construction and operation of mechanism for attaching cumbersome loads such as boats to transporting trailers or the like during haulage of such loads.

The primary object of this invention is to provide an improved boat tie-down mechanism associable with a transporting trailer, which is simple in construction, safely usable, and conveniently manipulable.

When transporting heavy and bulky loads such as boats from place to place with the aid of road vehicle drawn trailers, it is of utmost importance to firmly attach the boat to the trailer so as to positively prevent loosening or detachment of the loads during transportation thereof, while still permitting rapid release of the boat whenever the desired destination has been reached. Although numerous so-called boat tie-down devices for such purposes have heretofore been proposed and placed in actual use, none of these prior attachments have proven entirely satisfactory either because they were too complicated and difficult to apply and to manipulate, or they were dangerous to manipulate and utilize, or they were unable to effectively hold the boat in place so as to definitely prevent damaging or entirely releasing it when traveling over rough roads.

It is therefore a more specific important object of the present invention to provide a simplified but more reliable and safely operable boat-trailer attachment, which is extremely flexible in its adaptations.

Another important object of this invention is to provide an improved tie-down assemblage for portable loads, which is conveniently attachable and manipulable to firmly maintain the load in place upon its carrier, but which may also be readily released or entirely removed when desired.

A further important object of the invention is to provide a new and highly efficient load tie-down device which is operable to automatically latch the load in fixed position upon a transporting vehicle, while being quickly releasable for unloading purposes.

Still another important object of our invention is to provide an improved boat-trailer tie-down structure all parts of which may be readily fabricated from stock materials and assembled to produce a durable unit at moderate cost.

An additional important object of the invention is to provide a load tie-down unit for trailers or the like, which may be conveniently adjusted to meet various conditions and which is therefore highly flexible in its adaptations.

These and other more specific objects and advantages of the invention will be apparent from the following detailed description from which it will be noted that the gist of the improvement is the provision of a tie-down for transportable loads comprising brackets attachable to the vehicle and its load respectively, a flexible element having one end secured to one of the brackets while its opposite end is provided with a loop, and a rotary member journalled on the other bracket and cooperating with the looped end of the flexible element to tension the latter when the member is rotated.

A clear conception of the features constituting the present improvement and of the construction and operation of a typical commercial boat-trailer tie-down embodying the invention, may be had by referring to the drawing accompanying and forming a part of this specification wherein like reference characters designate the same or similar parts in the various views.

Fig. 1 is a fragmentary side view of one of the improved tie-down mechanisms, showing the actuating member in latching position in solid lines and in unlocked position in dot-and-dash lines, and also showing a portion of the upper bracket in alternative solid and dot-and-dash line positions;

Fig. 2 is a similarly fragmentary front elevation of the same tie-down unit, showing the actuating member in latching position;

Fig. 3 is a fragmentary enlarged section through the assemblage of Figs. 1 and 2, taken along the line 3—3 of Fig. 1; and Fig. 4 is an enlarged section similar to that of Fig. 3, but showing a modified type of latching mechanism.

While the invention has been shown and described herein as being especially advantageously applicable to boat-trailer tie-downs utilizing metallic chains as the flexible elements for interconnecting the brackets carried by the load and vehicle respectively, it is not the intent to restrict the use of the improved tie-downs or their construction by virtue of this limited embodiment; and it is also contemplated that specific descriptive terms employed herein be given the broadest possible interpretation consistent with the disclosure.

Referring to the drawing, the improved boat-trailer tie-down unit shown therein, comprises in general, a lower bracket 6 adapted to be attached to a hauling vehicle; an upper bracket 7 adapted to coact with a load such as the transom or gunwale of a boat carried by the vehicle; an elongated connecting element such as a flexible and resilient chain 8 having one end portion secured to the lower bracket 6 while its opposite extreme end is provided with an opening or loop 9; and a latching member or lever consisting of a pivot shaft 10 journalled for rotation on the bracket 7 and having an integral transverse cam and actuating portion 11 provided with a handle 12 at its outer swinging end.

The lower and upper brackets 6, 7 may be formed of durable sheet metal with the aid of punches and dies, and the lower bracket 6 is firmly attachable to the load transporting vehicle by means of a bolt applied to an opening 14 formed in the downwardly extending flange of this bracket, while the outwardly extending upper hook-shaped portion thereof is provided with an open slot 15 as shown in Figs. 1 and 2. The upper bracket 7 is of inverted L-shape and has an upper horizontal section 16 adapted to engage an upper surface of the load and to be firmly but adjustably secured to an inverted L-shaped clamp 17 by means of bolts 18 and nuts 19. This clamp 17 may also be formed of durable sheet metal and is provided with elongated slots 20 in both of its branches so that it may be adjusted either laterally toward or away from the depending section of its carrier bracket 7, or changed from the position shown in solid lines to the dot-and-dash line position shown in Fig. 1.

This construction makes it possible to clampingly apply the upper bracket 7 to wide or narrow parts of the loads such as the transom or gunwales of boats, and in order to prevent marring finished surfaces of such boats the depending portions of the bracket 7 and clamp 17 may be provided with resilient pads 22. The upper bracket 7 is also provided with an auxiliary frame 23 formed of heavy sheet metal and which is firmly secured to the upright section of this bracket as by welding, and the frame 23 has a pair of outwardly projecting parallel ears 24 providing spaced bearings for the shaft 10 of the latching lever and one of which has a groove 25 formed therein as shown in Figs. 2 and 3, facing the space between the ears 24.

The elongated flexible and resilient element 8 may be formed of strong standard chain stock of any desired length preferably having a link at or near its lower end attached to the eye of an eye-bolt 27 of considerable length, the threaded shank 28 of which is insertible laterally within the slot 15 formed in the hook-portion of the lower bracket 6. An adjusting nut 29 and a lock nut 30 may be applied to the eye-bolt shank 28 as in Figs. 1 and 2, in order to properly adjust the chain 8 longitudinally for proper coaction of the uppermost link loop 9 with the latch lever, and the latching member or lever may be formed of heavy rod stock and is journalled for rotation in the ears 24 of the frame 23 constituting a part of the upper bracket 7. The pivot shaft 10 of the latch lever is pierced by a pin 31 which is adapted to latchingly engage the groove 25 of one of the ears 24 whenever the latch lever is swung into latching position as shown in solid lines in Figs. 1 and 2, and this pin 31 is constantly resiliently urged toward the grooved ear 24.

This constant resilient urging of the pin 31 toward the groove 25 may be effected in various ways, and as illustrated in Figs. 2 and 3, the pivot shaft 10 of the latch lever is embraced by several washers 33 one of which coacts with the pin 31 while another is engaged by a standard spring washer 34 coacting with the ear 24 remote from the grooved ear, and which obviously forces the shaft 10 toward the right at all times. As illustrated in the modification of Fig. 4, the pivot shaft 10 of the latch lever is surrounded by a single washer 33' coacting with the pin 31 and by a helical compression spring 34' interposed between the washer 33' and the ear 24 remote from the grooved ear, and this spring 34' obviously also forces the shaft 10 toward the right at all times. In both of these assemblages, the pin 31 may be removed to permit withdrawal of the shaft 10 from the ears 24 when the latch lever portion 11 is to be applied to or removed from the end loop 9 of the chain 8.

When the various parts of the improved tie-down device have been properly constructed as shown and described, they may be readily assembled and adjusted with the aid of an ordinary wrench to properly cooperate with hauling vehicles and a load such as a boat of various dimensions, by fixedly attaching the lower bracket 6 to the vehicle frame or draft tongue, by adjusting the upper bracket 7 and clamp 17 to fit the load such as the transom or gunwale of the boat, and by applying the eye of the bolt 27 to any one of the lower chain links which will enable the chain 8 to be subsequently properly tensioned when the eye bolt 27 is adjusted to take up excess slack in the chain. The bolts 18 should then be tightened to cause the upper bracket 7 and clamp 17 to snugly engage the load, and the nuts 29, 30 associated with the eye-bolt shank 27 should be operated to produce slight initial tension in the chain 8 after this shank has been inserted within the lower bracket slot 15 and while the cam lever 11 has been swung forward.

With the tie-down unit thus assembled and applied to the vehicle and its load, the handle 12 of the latching lever may be swung toward the upper bracket 7 thus causing the upper loop 9 of the flexible chain 8 to ride along the curved cam portion 11 toward the pivot shaft 10. As the latching lever approaches its final latching position as shown in solid lines in Figs. 1 and 2, the chain 8 will be stretched and will subsequently contract slightly to cause the loop 9 to assume final chain tensioning position coaxially of the shaft 10 and the latch pin 31 will simultaneously snap into the groove 25 of the adjacent ear 24 by virtue of the resilient pressure exerted against this pin 31 by the spring washer 34 and washers 33, or by the alternative spring 34' and washer 33'. This final latching position is effected with a snap action and the pin 31 thereafter effectively holds the latch lever in latching position. However, when it becomes desirable to release the tie-down mechanism, it is only necessary to swing the latching lever forwardly as illustrated in dot-and-dash lines in Fig. 1, until the chain tension has been entirely released, whereupon the eye-bolt 27 may be freely removed from within the lower bracket slot 15.

It will thus be noted that the present invention in fact provides a simple but effective tie-down for transportable loads, which automatically latches the elongated flexible element or chain 8 into load holding position whenever the latching lever is swung into such position. The flexibility and resiliency of the successive links of the chain 8 is important in permitting this chain to be stretched longitudinally beyond normal tie-down position while the device is being applied, and in causing the end loop 9 to finally snap into position coaxially of the shaft 10 with the chain 8 still under considerable tension when the latching lever has been swung into latching position. Such chain 8 is readily available in the open market, and the chains 8 may be of any desired length so that they will accommodate a maximum spread between the brackets 6, 7, and any excess chain remaining when the distance between the brackets is short may be allowed to dangle from the eye of the bolt 27.

All of the sheet metal parts of the improved tie-down assemblages may be readily constructed with the aid of punches and dies, and the latching levers and the pins 31 may be produced from rod stock, while the washers 33, 33' and the spring washers 34 or the springs 34' may also be of standard construction, thus permitting manufacture of the units at moderate cost for diverse usage. The improved devices are also extremely flexible in adaptation and may be quickly adjusted and applied to meet various conditions without danger of marring the parts to which they are applied. The invention has proven highly satisfactory and successful in actual use as applied to boat-trailer transporting vehicles and the improved latching mechanism has been found to resist violent jolting resulting from transportation over rough roads.

It should be understood that it is not desired to limit this invention to the exact details of construction or to the precise usage of the tie-down mechanism herein shown and described, for various modifications within the scope of the appended claims may occur to persons skilled in the art.

We claim:

1. In a tie-down mechanism for vehicle transportable loads, a bracket attachable to the vehicle, another bracket attachable to a load carried by the vehicle and being located remote from the vehicle bracket, a chain having one end link swingably attached to one of said brackets, and a unitary lever having a laterally extending fulcrum shaft journalled for rotation in the other bracket and being provided with a cam adjoining said shaft cooperable with an opposite end link of said chain to tension the chain and to move said opposite end link about the shaft when the lever is swung into tie-down position.

2. In a tie-down mechanism for vehicle transportable loads, a lower bracket attachable to the vehicle, an upper bracket detachably attachable to a load carried by the vehicle and being spaced from said lower bracket, a chain having a lower end link adjustably and swingably attached to said lower bracket, and a unitary lever having a laterally extending fulcrum shaft journalled for rotation in said upper bracket and being provided with a cam adjoining said shaft cooperable with an upper link of said chain to tension the chain and to move said upper link about the shaft when the lever is swung into tie-down position.

3. In a tie-down mechanism for vehicle transportable loads, a bracket attachable to the vehicle, another bracket attachable to a load carried by the vehicle and being located remote from the vehicle bracket, a chain having one end link swingably attached to one of said brackets, and a lever having a laterally extending fulcrum shaft journalled for rotation in the other bracket and being provided with a cam adjoining said shaft cooperable with an opposite end link of said chain to tension the chain and to move said opposite end link about the shaft when the lever is swung into tie-down position, said lever also having an actuating handle remote from its shaft formed to rest against said other bracket to retain said opposite end chain link upon said shaft.

4. In a tie-down mechanism for vehicle transportable loads, a lower bracket attachable to the vehicle, an upper bracket detachably attachable to a load carried by the vehicle and being spaced from said lower bracket, a chain having a lower end link adjustably and swingably attached to said lower bracket, and a lever having a laterally extending fulcrum shaft journalled for rotation in said upper bracket and being provided with a cam adjoining said shaft cooperable with an upper link of said chain to tension the chain and to move said upper link about the shaft when the lever is swung into tie-down position, said lever also having an integral actuating handle remote from its fulcrum shaft formed to rest upon the top of said other bracket to maintain said opposite end chain link upon said shaft.

5. In a tie-down mechanism for vehicle transportable loads, a bracket attachable to the vehicle, another bracket attachable to a load carried by the vehicle and being located remote from the vehicle bracket, a chain having one end link swingably attached to one of said brackets, a lever having a laterally extending fulcrum shaft journalled for rotation in the other bracket and being provided with a cam adjoining said shaft cooperable with an opposite end link of said chain to tension the chain and to move said opposite end link about the shaft when the lever is swung into tie-down position, and means coacting with said shaft and said other bracket for automatically locking said lever in tie-down position.

References Cited in the file of this patent

UNITED STATES PATENTS

| | | |
|---|---|---|
| 1,061,283 | Griffin | May 13, 1913 |
| 1,585,955 | Willis | May 25, 1926 |

FOREIGN PATENTS

| | | |
|---|---|---|
| 175,479 | Great Britain | Feb. 23, 1922 |